(12) United States Patent
Miyachi

(10) Patent No.: US 11,110,955 B2
(45) Date of Patent: Sep. 7, 2021

(54) ELECTRIC STEERING DEVICE

(71) Applicant: DENSO CORPORATION, Kariya (JP)

(72) Inventor: Syuhei Miyachi, Kariya (JP)

(73) Assignee: DENSO CORPORATION, Aichi-pref (JP)

( * ) Notice: Subject to any disclaimer, the term of this patent is extended or adjusted under 35 U.S.C. 154(b) by 0 days.

(21) Appl. No.: 16/857,515

(22) Filed: Apr. 24, 2020

(65) Prior Publication Data

US 2020/0377143 A1 Dec. 3, 2020

(30) Foreign Application Priority Data

May 29, 2019 (JP) .............................. JP2019-100461

(51) Int. Cl.
| | |
|---|---|
| *B62D 5/00* | (2006.01) |
| *B62D 5/04* | (2006.01) |
| *H02P 27/08* | (2006.01) |
| *H02P 25/22* | (2006.01) |
| *H02P 29/032* | (2016.01) |
| *H02M 7/5387* | (2007.01) |

(52) U.S. Cl.
CPC ........ *B62D 5/046* (2013.01); *H02M 7/53871* (2013.01); *H02P 25/22* (2013.01); *H02P 27/08* (2013.01); *H02P 29/032* (2016.02); *B62D 5/0412* (2013.01)

(58) Field of Classification Search
None
See application file for complete search history.

(56) References Cited

U.S. PATENT DOCUMENTS

| | | | | |
|---|---|---|---|---|
| 5,361,210 | A * | 11/1994 | Fu ........................ | B62D 5/046 180/446 |
| 8,983,727 | B2 * | 3/2015 | Kifuku ................... | H02P 29/02 701/42 |
| 2002/0057070 | A1 * | 5/2002 | Thomsen ............... | B62D 5/003 318/801 |
| 2006/0001392 | A1 * | 1/2006 | Ajima ................... | B62D 5/0463 318/432 |
| 2007/0029959 | A1 * | 2/2007 | Ta .......................... | B62D 5/046 318/432 |
| 2010/0250067 | A1 * | 9/2010 | Matsumura ............. | H02P 21/16 701/41 |
| 2016/0036288 | A1 | 2/2016 | Yamasaki et al. | |
| 2017/0217481 | A1 | 8/2017 | Asao et al. | |

FOREIGN PATENT DOCUMENTS

| | | |
|---|---|---|
| JP | 2016-036245 A | 3/2016 |
| JP | 6223593 B2 | 11/2017 |

* cited by examiner

*Primary Examiner* — Bentsu Ro

(74) *Attorney, Agent, or Firm* — Maschoff Brennan

(57) ABSTRACT

An electric steering device includes a motor and a control circuit. The motor applies a steering force to a steering mechanism of a vehicle. The control circuit includes an inverter that converts DC power of a DC power supply to AC power and supplies the AC power to the motor, and a power supply relay that permits or blocks a current flow to the motor through the inverter. In the control circuit, the power supply relay is provided on a ground line connecting the inverter and a ground.

11 Claims, 13 Drawing Sheets

ELECTRIC STEERING DEVICE

CROSS REFERENCE TO RELATED APPLICATION

The present application claims the benefit of priority from Japanese Patent Application No. 2019-100461 filed on May 29, 2019. The entire disclosures of the above application are incorporated herein by reference.

TECHNICAL FIELD

The present disclosure relates to an electric steering device.

BACKGROUND

For example, an electric steering device includes a motor that applies a steering force to a steering mechanism of a vehicle, and a control circuit that includes an inverter and a power supply relay.

SUMMARY

The present disclosure describes an electric steering device including a motor and a control circuit. The motor applies a steering force to a steering mechanism of a vehicle. The control circuit includes an inverter that converts DC power of a DC power supply to AC power and supplies the AC power to the motor, and a power supply relay that permits or blocks a current flow to the motor through the inverter. In the control circuit, the power supply relay is provided on a ground line connecting the inverter and a ground.

BRIEF DESCRIPTION OF DRAWINGS

Objects, features and advantages of the present disclosure will become more apparent from the following detailed description made with reference to the accompanying drawings, in which.

DETAILED DESCRIPTION

Figure 1:
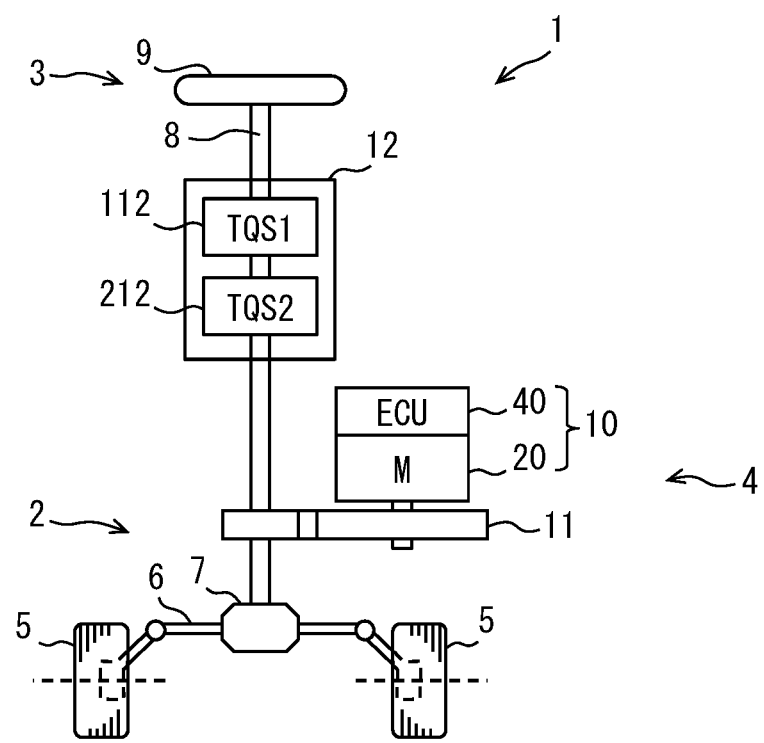
FIG. 1 is a block diagram of a steering system according to a first embodiment.

An electric steering device includes a motor that applies a steering force to a steering mechanism of a vehicle, and a control circuit that includes an inverter and a power supply relay.

For example, the power supply relay may be provided in a power supply line, and a coil configuring a filter circuit may be provided on the power supply line. Further, the power supply relay may be provided between the coil and an inverter. Such an electric steering device is described in JP 2016-36245 A, which corresponds to US 2016/036288 A1. The descriptions of JP2016-36245 A, which corresponds to US 2016/036288 A1, are incorporated herein by reference as explanation of technical components in this specification.

The present disclosure provides an electric steering device that is reduced in body size.

According to an aspect of the present disclosure, an electric steering device includes a motor and a control circuit. The motor applies a steering force to a steering mechanism of a vehicle. The control circuit includes an inverter that converts DC power of a DC power supply to AC power and supplies the AC power to the motor, and a power supply relay that permits or blocks a current flow to the motor through the inverter. In the control circuit, the power supply relay is provided on a ground line connecting the inverter and a ground.

According to the electric steering device of the above aspect, the power supply relay is provided on the ground line. In such a configuration, a drive voltage to turn on the power supply relay can be reduced, as compared with a configuration where the power supply relay is provided on a power supply line. In addition, heat dissipation of the power supply relay can be increased, as compared with the configuration where the power supply relay is provided on the power supply line. As a result, a body of the control circuit and in turn a body of the electric steering device can be reduced in size.

Hereinafter, embodiments of the present disclosure will be described in detail with reference to the drawings. In the embodiments, functionally and/or structurally corresponding portions and/or relevant portions may be designated by the same reference numeral or reference numerals different in three or more digits. Description of another embodiment can be referred to for the corresponding portions and/or relevant portions.

First Embodiment

Firstly, a steering system will be described with reference to FIG. 1.

<Steering System>

The steering system 1 shown in FIG. 1 is a system for a vehicle. The steering system 1 includes a steering mechanism 2, a manual operating mechanism 3, and an electric steering device 4. The word "vehicle" in this specification should be interpreted in a wide sense to include taxiing vehicles, ships, aircrafts, simulation devices, and amusement machines. The steering mechanism 2 controls a wheel direction or a rudder direction.

The steering mechanism 2 changes a movement direction of a vehicle. The steering mechanism 2 changes the movement direction of the vehicle by deflecting a rotation axis of a vehicle 5. The steering mechanism 2 includes, for example, wheels 5, a steering hub, a tie rod 6, a steering gear box 7, and a steering column 8. Rotation of the steering column 8 is converted to parallel translation by the steering gear box 7 and transmitted to the tie rod 6. The steering gear box 7 can be provided in a rack-and-pinion type or a ball-and-nut type. The tie rod 6 deflects the rotation axis of the vehicle 5 through operation of the steering hub. The steering mechanism 2 corresponds to the above steering mechanism.

The manual operating mechanism 3 enables steering by manual operation of a user. The manual operating mechanism 3 has a steering handle 9. The steering handle 9 is operated by a user to rotate the steering column 8.

The electric steering device 4 is an electric drive mechanism that enables steering relevant to user intention and/or enables steering in response to a demand from another control device irrelevantly to the user intention. The electric steering device 4 assists an force of a user, for example. Alternatively, or additionally, the electric steering device 4 provides an operational force for automatic travelling, for example. The electric steering device 4 may be referred to as electric power steering device.

The electric steering device 4 includes a drive unit 10. The drive unit 10 includes a motor (M) 20 to apply a steering force to the steering mechanism 2 and an electronic control unit (ECU) 40 to control the motor 20. The electronic control unit 40 corresponds to a control circuit. Hereinafter, the electronic control unit 40 is referred to as ECU 40. In the first embodiment, the motor 20 has a plurality of sets of stator coils. The ECU 40 has a plurality of circuit systems made redundant in correspondence to the stator coils.

The electric steering device 4 has a power transmission mechanism 11. The power transmission mechanism 11 transmits a rotational force of the motor 20 to the steering column 8. The power transmission mechanism 11 can be provided by various mechanisms such as, for example, a gear train or a chain.

The steering system 1 has a torque sensor system 12. The torque sensor system 12 has a torque sensor (TQR1) 112 and a torque sensor (TQS2) 212. The two torque sensors 112 and 212 each detect a torque exerted on the steering column 8. The detected torque indicates an operating force exerted on the manual operating mechanism 3. The torque sensors 112 and 212 provide a redundant torque sensor system 12. The torque sensors 112 and 212 correspond to systems L1 and L2, respectively, as described later.

<Structure of Drive Unit>

A schematic structure of the drive unit 10 is now described with reference to FIG. 2.

Figure 2:
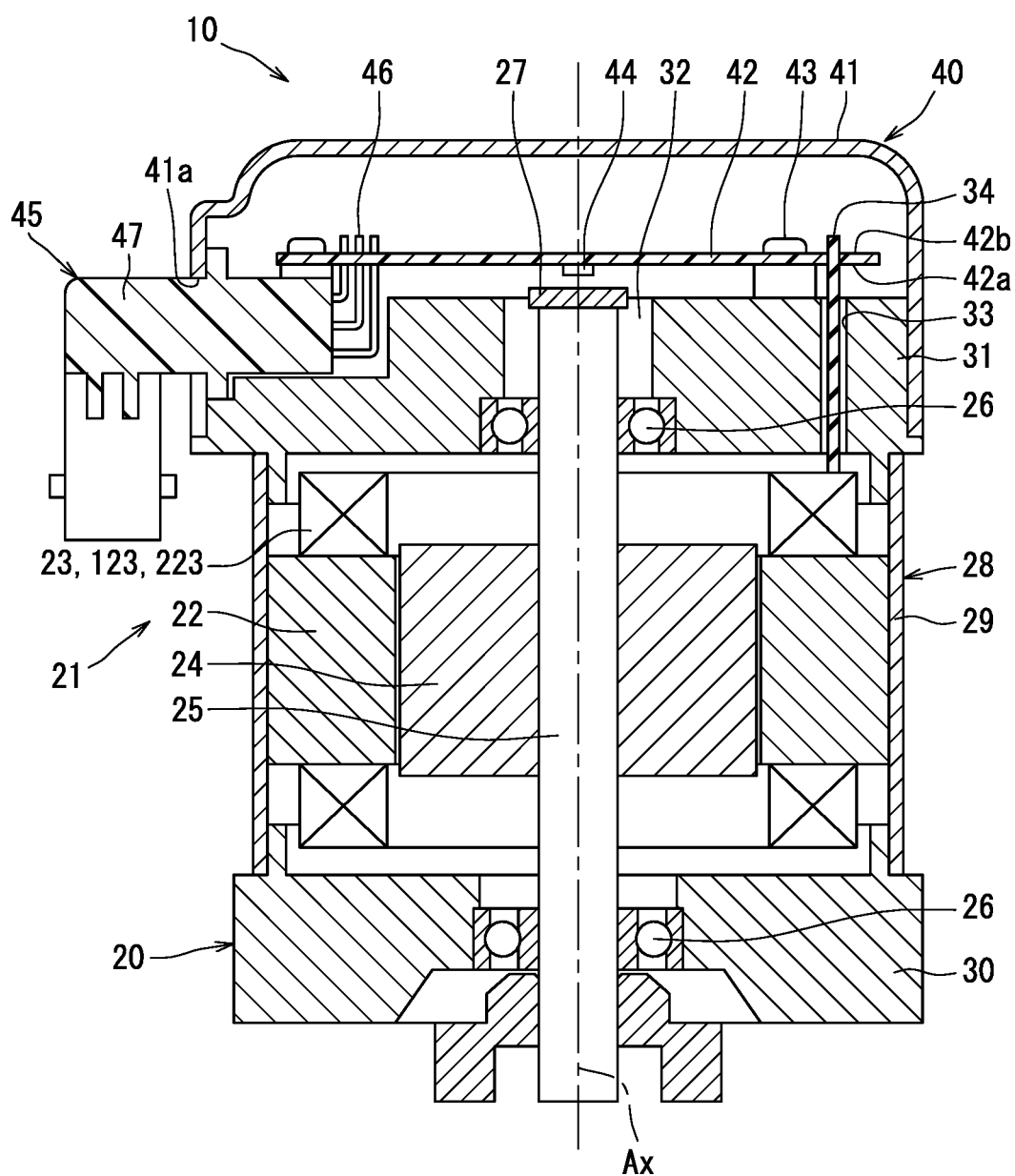
FIG. 2 is a sectional view of a drive unit.

As shown in FIG. 2, the drive unit 10 is an electromechanical device in which the motor 20 and the ECU 40 are integrally provided. The drive unit 10 can be said to be the motor 20 with the ECU 40. The ECU 40 is disposed on one side in an axial direction of the motor 20. The ECU 40 is provided on a side opposite to the power transmission mechanism 11 (for example, reduction gear) with respect to the motor 20. The ECU 40 is disposed coaxially with the center line Ax of a rotating shaft 25. The electromechanical structure makes it possible to efficiently dispose the motor 20 and the ECU 40 in a vehicle having a restricted mounting space. Hereinafter, when "axial direction" or "radial direction" is simply referred, it means the axial direction or radial direction of the motor 20.

The motor 20 is a three-phase brushless motor. The motor 20 outputs at least a part of torque required for steering. The motor 20 includes a stator 21, a rotor 24, the rotating shaft 25, and a housing 28.

The stator 21 has a stator core 22 and a stator coil 23 wound on the stator core 22. The stator coil 23 may be referred to as stator winding. The stator coil 23 of the stator 21 includes two sets of stator coils 123 and 223 as described later. The stator core 22 is fixed to the housing 28. The stator coils 123 and 223 are wound on the one stator core 22.

The rotor 24 is provided on a radially inner side with respect to the stator 21. The rotor 24 is provided to be rotatable relative to the stator 21. The rotating shaft 25 is fitted in the rotor 24 and rotates integrally with the rotor 24. The rotating shaft 25 is rotatably supported by the housing 28 with bearings 26. The rotating shaft 25 may be referred to as shaft. An end of the rotating shaft 25 on a side adjacent to ECU 40 projects from the housing 28 toward the ECU 40. A magnet 27 is provided at the end of the rotating shaft 25 on the side adjacent to ECU 40 to detect a rotation angle of the motor 20.

The housing 28 includes a case 29, a front frame end 30, and a rear frame end 31. The housing 28 is formed of a metal material. The case 29 has a cylinder shape, and the center of that cylinder roughly coincides with the center line Ax. The stator 21 and the rotor 24 are mostly contained in the cylinder of the case 29. The front frame end 30 is provided on axially one end side of the case 29. The rear frame end 31 is provided on the other end side of the case 29.

The rear frame end 31 has through-holes 32 and 33. The rotating shaft 25 penetrates the through-hole 32 and projects toward the ECU 40. A lead 34 is connected to each phase of the stator coils 123 and 223. The lead 34 penetrates the through-hole 33 and projects toward the ECU 40.

The ECU 40 includes a cover 41, a substrate 42, various electronic components mounted on the substrate 42, and a connector 45. The cover 41, with the rear frame end 31, provides an accommodation space of the substrate 42 and the like. The cover 41 has a roughly cylindrical shape opened at one end and is fitted on a radially outer side of the rear frame end 31. The cover 41 is provided to cover the substrate 42. A casing configured by the cover 41 and the rear frame end 31 protects the ECU 40 from external shock and from invasion of dust, water, and the like.

In the substrate 42, a wiring pattern, made of copper or the like as a material, is disposed on an insulating base made of resin or the like. The substrate 42 may be referred to as wiring substrate or printed substrate. The substrate 42, on which electronic components are mounted, may be referred to as circuit substrate. The substrate 42 is connected to the lead 34. The lead 34 is mounted in an inserted manner. The substrate 42 is fixed by bolts 43 to a surface of the rear frame end 31 on a side opposite to the motor 20. The bolts 43 are each formed of a conductive material. Hereinafter, a surface of the substrate 42 on a side adjacent to the motor 20 is referred to as motor surface 42a, and a surface of the substrate 42 on a side opposite to the motor 20 is referred to as cover surface 42b.

While not shown, the various electronic components, such as a unified IC including a microcomputer and a predriver as described later, switching elements configuring an inverter, various relays, elements configuring filters 172 and 272, and smoothing capacitors, are mounted on the substrate 42. The electronic components mounted on the substrate 42 include a rotation angle sensor 44 shown in FIG. 2. The rotation angle sensor 44 is provided on the motor surface 42a of the substrate 42 and at a position overlapping the center line Ax. The rotation angle sensor 44 detects a change in magnetic field caused by the magnet 27 provided on the rotating shaft 25, and outputs a detection signal in correspondence to a rotation angle of the rotating shaft 25.

The connector 45 is mounted on the substrate 42. The connector 45 includes a plurality of terminals 46 and a housing 47 holding the terminals 46. The terminals 46 electrically connect a circuit, formed by the substrate 42 and the electronic components, and an external device. The cover 41 has an opening 41a at a part of a tubular-shaped wall thereof. The connector 45 is partially exposed to the outside from the opening 41a. The terminals 46 are mounted in an inserted manner. As described later, the terminals 46 include a +B terminal, an IG terminal, a ground terminal, and a signal terminal for each of the systems L1 and L2.

Heat of the electronic components may be dissipated to the rear frame end 31 or the cover 41 by a heat conducting member (not shown) such as heat dissipation gel. A thermal via may be provided in the substrate 42. For example, heat of the electronic components mounted on the cover surface 42b may be released to the rear frame end 31 through the thermal via and the heat dissipation gel.

<Circuit Configuration of Drive Unit>

Figure 3:
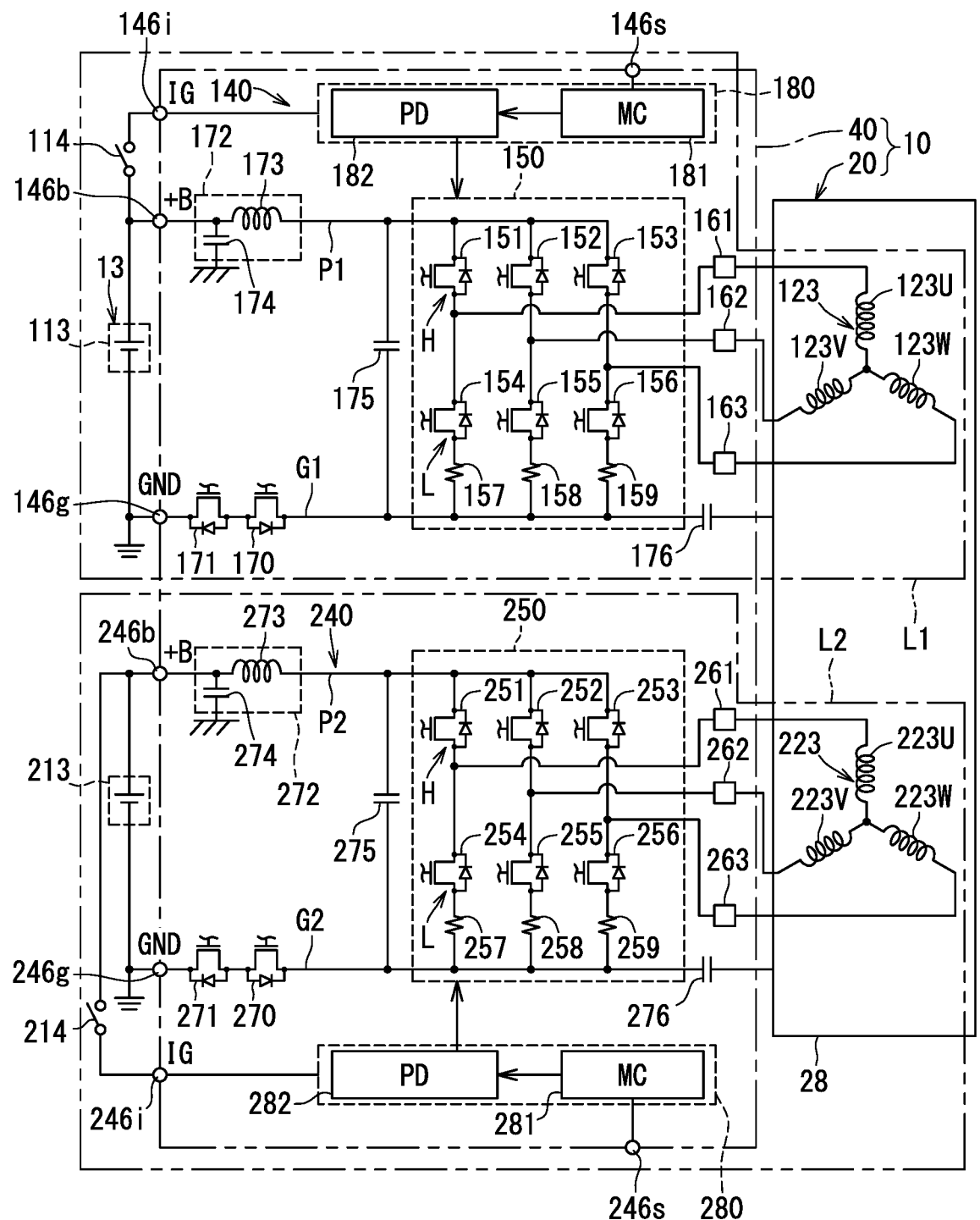
FIG. 3 is a circuit diagram of the drive unit.

A circuit configuration of the drive unit 10 is now described with reference to FIG. 3. In FIG. 3, signal lines from the predriver to a motor relay, a power supply relay, and a reverse connection protection relay are not shown to avoid complication of the drawing. Signal lines to the switching elements of the inverter are also simplified.

As shown in FIG. 3, the motor 20 has two sets of stator coils 123 and 223. The stator coils 123 and 223 are equivalent to each other in electric characteristics and cancel-wound on the common stator core 22 while electric angles are shifted by 30 degrees from each other. As a result, the stator coils 123 and 223 are controlled such that phase currents, having phases φ shifted by 30 degrees, are applied to the respective stator coils. The stator coil 123 includes a U-phase stator coil 123U, a V-phase stator coil 123V, and a W-phase stator coil 123W. The stator coil 223 includes a U-phase stator coil 223U, a V-phase stator coil 223V, and a W-phase stator coil 223W.

Hereinafter, a combination of configurations for current application control of the stator coil 123 is referred to as system L1, and a combination of configurations for current application control of the stator coil 223 is referred to as system L2. Components of the system L1 are largely given reference numerals of 100s, while components of the system L2 are largely given reference numerals of 200s. Components common to the systems L1 and L2 have the same lower second digits of the reference numerals. The components of the system L1 may be designated by "first". The components of the system L2 may be designated by "second".

A power supply system 13 of a vehicle has power supply units supplying DC power. Each power supply unit may include various power supplies such as a battery, a generator, and a fuel cell. The power supply unit may be referred to as battery. The power supply system 13 has two power supply units 113 and 213 that supply power to the motor 20. The power supply units 113 and 213 each correspond to the DC power supply.

The ECU 40 has two circuit systems 140 and 240 as a circuit system to control the motor 20. The two circuit systems 140 and 240 allow the control system for the motor 20 to be made redundant. The redundancy may be referred to as multiplexing. The circuit system 140 configures the system L1 together with the power supply unit 113 and the stator coil 123. The circuit system 240 configures the system L2 together with the power supply unit 213 and the stator coil 223.

The first circuit system 140 includes an inverter 150, motor relays 161 to 163, a power supply relay 170, a reverse connection protection relay 171, a filter 172, a smoothing capacitor 175, and a control section 180. Similarly, the second circuit system 240 includes an inverter 250, motor relays 261 to 263, a power supply relay 270, a reverse connection protection relay 271, a filter 272, a smoothing capacitor 275, and a control section 280.

The connector 45 of the ECU 40 includes, as the terminals 46, terminals 146b, 146g, 146i, 146s configuring the circuit system 140 and terminals 246b, 246g, 246i, 246s configuring the circuit system 240. The +B terminal 146b is connected to the positive electrode of the power supply unit 113. The +B terminal 146b may be referred to as power IG (PIG) terminal. The circuit system 140 has a power supply line P1 connected to the +B terminal 146b. In the circuit system 140, power for the power system is supplied through the +B terminal 146b and the power supply line P1. A ground (GND) terminal 146g is connected to the negative electrode of the power supply unit 113. The circuit system 140 has a ground line G1 connected to the ground terminal 146g. The IG terminal 146i is connected to the positive electrode of the power supply unit 113 through an IG switch 114. In the circuit system 140, power for the control system is supplied through the IG terminal 146i and the IG line. For example, the control power is supplied to the control section 180 through an internal power supply circuit (not shown). The signal terminal 146s receives a detection signal of the torque sensor 112, vehicle speed information, and the like.

The terminals 246b, 246g, 246i, and 246s have configurations similar to those of the terminals 146b, 146g, 146i, and 146s, respectively. That is, the +B terminal 246b is connected to the positive electrode of the power supply unit 213. The +B terminal 246b is connected to a power supply line P2. A ground terminal 246g is connected to the negative electrode of the power supply unit 213. The ground terminal 246g is connected to a ground line G2. An IG terminal 246i is connected to the positive electrode of the power supply unit 213 through an IG switch 214. The signal terminal 246s receives a detection signal of the torque sensor 212, vehicle speed information, and the like.

The first inverter 150 converts DC power supplied form the power supply unit 113 to AC power and outputs the DC power to the stator coil 123 of the motor 20. The inverter 150 has switching elements 151 to 156 configuring upper and lower three-phase arm circuits. For example, MOSFET or IGBT can be used for each switching element. In the first embodiment, n-channel MOSFET is used. The switching elements 151 to 153 configure the upper arm H, and the switching elements 154 to 156 configure the lower arm L.

The switching elements 151 and 154 are connected together in series between the power supply line P1 and the ground line G1, and configure upper and lower U-phase arm circuits. A connecting point of the U-phase switching elements 151 and 154 is connected to a first end of the stator coil 123U. The switching elements 152 and 155 are connected together in series between the power supply line P1 and the ground line G1, and configure upper and lower V-phase arm circuits. A connecting point of the V-phase switching elements 152 and 155 is connected to a first end of the stator coil 123V. The switching elements 153 and 156 are connected together in series between the power supply line P1 and the ground line G1, and configure upper and lower W-phase arm circuits. A connecting point of the W-phase switching elements 153 and 156 is connected to a first end of the stator coil 123W. Second ends of the stator coils 123U, 123V, and 123W are connected to one another.

The circuit system 140 includes shunt resistors 157 to 159 to detect respective phase currents flowing through the stator coils 123U, 123V, and 123W. In the example shown in FIG. 3, the shunt resistors 157 to 159 are provided on lower electric potential sides of the corresponding switching elements 154 to 156.

The second inverter 250 has a configuration similar to that of the first inverter 150. The inverter 250 has switching elements 251 to 253 configuring the upper arm H and switching elements 254 to 256 configuring the lower arm L. The respective output points of the upper and lower arm circuits of the U, V, and W phases are connected to the corresponding stator coils 223U, 223V, and 223W. Shunt resistors 257 to 259 are provided to detect respective phase currents on lower electric potential sides of the switching elements 254 to 256, respectively.

The first motor relays 161 to 163 are provided between the inverter 150 and the stator coil 123. The motor relays 161 to 163 are provided such that electric connection between the inverter 150 and the stator coil 123 can be broken. When failure or the like occurs, the motor relays 161 to 163 are each turned off by a drive signal from the control section 180 to block current supply to the motor 20. In the first embodiment, MOSFET is used as each of the motor relays 161 to 163.

The U-phase motor relay 161 is provided between the connecting point of the switching elements 151 and 154, and the stator coil 123U. The V-phase motor relay 162 is provided between the connecting point of the switching elements 152 and 155, and the stator coil 123V. The W-phase motor relay 163 is provided between the connecting point of the switching elements 153 and 156, and the stator coil 123W. The second motor relays 261 to 263 have configurations similar to those of the first motor relays 161 to 163, respectively.

The first power supply relay 170 permits or blocks a current flow to the stator coil 123 via the inverter 150. The power supply relay 170 is turned on to apply a current and turned off to block a current. When some abnormal condition of the ECU 40 occurs, the power supply relay 170 is turned off by a drive signal from the control section 180 to protect the inverter 150. In addition, the power supply relay 170 blocks a current flowing into the motor 20 via the inverter 150. The reverse connection protection relay 171 blocks a current flow in a direction opposite to the current flow permitted by the power supply relay 170. Since the reverse connection protection relay 171 is thus provided, even if positive and negative terminals of the power supply unit 113 are reversely connected, the reverse connection protection relay 171 prevents a current from flowing in a direction opposite to current flow in normal connection.

In the first embodiment, an n-channel MOSFET is used for each of the power supply relay 170 and the reverse connection protection relay 171. The power supply relay 170 is provided on the ground line G1 connecting the inverter 150 and the ground terminal 146g. The power supply relay 170 discharges a current to the ground in a current application permission state. The power supply relay 170 may therefore be referred to as discharge relay. The reverse connection protection relay 171 is also provided on the ground line G1. The reverse connection protection relay 171 is provided such that its parasitic diode is directed opposite to a parasitic diode of the power supply relay 170. The anodes, i.e., the sources of the power supply relay 170 and the reverse connection protection relay 171 are connected together. The reverse connection protection relay 171 is provided adjacent to the ground terminal 146g than the power supply relay 170.

The second power supply relay 270 and the second reverse connection protection relay 271 have configurations similar to those of the first power supply relay 170 and the first reverse connection protection relay 171, respectively. The power supply relay 270 and the reverse connection protection relay 271 are provided on the ground line G2 and the sources of the relays 270 and 271 are connected together.

The first filter 172 is a circuit to reduce noise transferred from another unit sharing the power supply unit 113 and noise transferred from the ECU 40 to another unit. The filter 172 is provided near the +B terminal 146b on the power supply line P1. The filter 172 includes a first filter coil 173 and a first capacitor 174. The first smoothing capacitor 175 is connected in parallel to the inverter 150. The smoothing capacitor 175 is an aluminum electrolytic capacitor, for example. The smoothing capacitor 175 accumulates electric charge to assist supply of power to the inverter 150.

The second filter 272 has a configuration similar to that of the first filter 172 and includes a second filter coil 273 and a second capacitor 274. The second smoothing capacitor 275 has a configuration similar to that of the first smoothing capacitor 175 and is connected in parallel to the inverter 250.

A first electromechanical connection capacitor 176 connects the ground line G1 of the system L1 and the housing 28 of the motor 20. A second electromechanical connection capacitor 276 connects the ground line G2 of the system L2 and the housing 28. The electromechanical connection capacitors 176 and 276 are each a ceramic capacitor, for example.

The first control section 180 controls drive, i.e., on-drive and off-drive, of the switching elements 151 to 156 of the inverter 150, the motor relays 161 to 163, the power supply relay 170, and the reverse connection protection relay 171. The second control section 280 controls drive, i.e., on-drive and off-drive, of the inverter 250, the motor relays 261 to 263, the power supply relay 270, and the reverse connection protection relay 271.

The control section 180 includes a microcomputer (MC) 181 and a predriver (PD) 182. The control section 280 includes a microcomputer (MC) 281 and a predriver (PD) 282. A predetermined operation power is supplied to the microcomputer 181 through the IG terminal 146i and an internal power supply circuit (not shown). A predetermined operation power is supplied to the microcomputer 281 through the IG terminal 246i and an internal power supply circuit (not shown). The microcomputers 181 and 281 each include CPU, ROM, RAM, a register, and an I/O port. In each of the microcomputers 181 and 281, the CPU performs processing according to a control program beforehand stored in the ROM or various data acquired from the outside while using a temporary storage function of the RAM or the register.

The first microcomputer 181 receives a detection signal of the rotation angle sensor 44 mounted on the substrate 42 and the phase currents detected by the shunt resistors 157 to 159. The first microcomputer 181 further receives a detection signal of the torque sensor 112 and vehicle speed information from a controller area network (CAN) bus. CAN is a registered trademark. The microcomputer 181, based on such types of information, generates a drive instruction (PWM signal) and outputs the drive instruction to the predriver 182 to assist steering of the steering handle 9 according to vehicle speed.

The first predriver 182 outputs a drive signal (drive voltage) based on the drive instruction of the microcomputer 181. The drive signal controls drive of switching elements 151 to 156, the motor relays 161 to 163, the power supply relay 170, and the reverse connection protection relay 171. The second microcomputer 281 and the second predriver 282 have configurations similar to those of the first microcomputer 181 and the first predriver 182, respectively.

As described above, power is supplied from the first power supply unit 113 to the first circuit system 140 and from the second power supply unit 213 to the second circuit system 240. Ground is also divided between the first circuit system 140 and the second circuit system 240. The first control section 180 controls the current application to the first stator coil 123, and the second control section 280 controls the current application to the second stator coil 223. In other words, the first system L1 and the second system L2 are made redundant. The drive unit 10 (electric steering device 4) of the first embodiment therefore has a fully redundant configuration.

<Conclusion of First Embodiment>

According to the first embodiment, the power supply relay 170 is provided on the ground line G1. In this case, since a reference potential is low, as compared with a configuration where the power supply relay is provided on the power supply line, a drive voltage (on drive voltage) to turn on the power supply relay 170 can be reduced. As a result, it is possible to simplify the internal power supply circuit, and reduce the body size of the substrate 42, i.e. the body size of the ECU 40.

In a case where the power supply relay is provided on the power supply line, a coil (filter) as a heat generating component is disposed between the power supply relay and the +B terminal. In such a case, due to heat interference, heat of the power supply relay cannot be effectively dissipated to the outside of the drive unit through the connector. According to the first embodiment, since the coil 173 does not exist between the power supply relay and the ground terminal 146g, heat of the power supply relay 170 can be dissipated to the outside through the connector 45. The ground line G1 occupies a major part of a wiring pattern formed on the substrate 42. The ground line G1 includes a solid ground pattern. Since an area of the wiring pattern is large, as compared with the power supply line P1, heat of the power supply relay 170 is easily released to the wiring pattern. Consequently, heat dissipation of the power supply relay 170 can be increased. Such an increase in heat dissipation makes it possible to reduce the body size of the power supply relay 170 itself and/or achieve high-density packaging on the substrate 42. As a result, the body size of the substrate 42, i.e., the body size of the ECU 40 can be reduced.

In this way, according to the first embodiment, the body size of the ECU 40 and in turn the body size of the drive unit 10 can be reduced.

For example, it is assumed that a gate voltage Vgs for on drive is 10 V, and a power supply voltage received through the +B terminal 146b is 14 V. In a configuration where the power supply relay is provided on the power supply line, a drive voltage must be applied with reference to the voltage 14 V, and thus 24 V is required for a drive voltage. On the other hand, in the configuration of the first embodiment, since the ground potential is a reference, it is sufficient to apply 10 V as the drive voltage. As described above, according to the first embodiment, the drive voltage of the power supply relay 170 can be equal to or lower than the power supply voltage of the power supply unit 113 supplied through the +B terminal 146b. Therefore, it is not necessary to have a boosting circuit for the power supply relay 170, for example.

According to the first embodiment, the reverse connection protection relay 171 is also provided on the ground line G1. For the reverse connection protection relay 171, likewise the power supply relay 170, the drive voltage for turn-on (on drive voltage) can be reduced. In addition, heat dissipation can be increased. Consequently, the body size of the substrate 42 (ECU 40) can be reduced.

According to the first embodiment, the power supply relay 170 and the reverse connection protection relay 171 are disposed such that anodes of their parasitic diodes are connected together. The sources of the power supply relay 170 and the reverse connection protection relay 171 are connected together. Consequently, a drive signal can be shared between the power supply relay 170 and the reverse connection protection relay 171. That is, the number of signal lines for the drive signals can be reduced. As a result, the body size of the substrate 42 (ECU 40) can be reduced.

The above-described effects are not limited to the system L1 (circuit system 140). In the first embodiment, the system L2 (circuit system 240) has a configuration similar to that of the system L1. Hence, the system L2 can exhibit effects similar to those of the system L1 (circuit system 140). Since the power supply relays 170 and 270 are provided on the ground lines G1 and G2, respectively, the substrate 42 and in turn the ECU 40 can be effectively reduced in size in the redundant configuration.

An example including two systems L1 and L2 have been shown, but the present disclosure is not limited to this example. As another example, the power supply relays may be provided on all the ground lines in three or more systems.

A connection mode of the power supply relay 170 and the reverse connection protection relay 171 is not limited to the source common connection described hereinabove. For example, the drains may be connected together. In such a case, signal lines of drive signals are divided between the power supply relay 170 and the reverse connection protection relay 171.

An example where the capacitors 174 and 274 are provided to configure the filters 172 and 272, respectively, has been shown, but the present disclosure is not limited to this example. The capacitors 174 and 274 may be eliminated such that the smoothing capacitors 175 and 275 also serve as filters.

An example where the housing 28 of the motors 20 is connected to the ground lines G1 and G2 through the electromechanical connection capacitors 176 and 276 has been shown, but the present disclosure is not limited to this example. For example, the electromechanical connection capacitors 176 and 276 may be eliminated to electrically connect the housing 28 and the ground lines G1 and G2.

Second Embodiment

The second embodiment is a modification of a precedent embodiment as a basic configuration and may incorporate description of the precedent embodiment.

Figure 4:
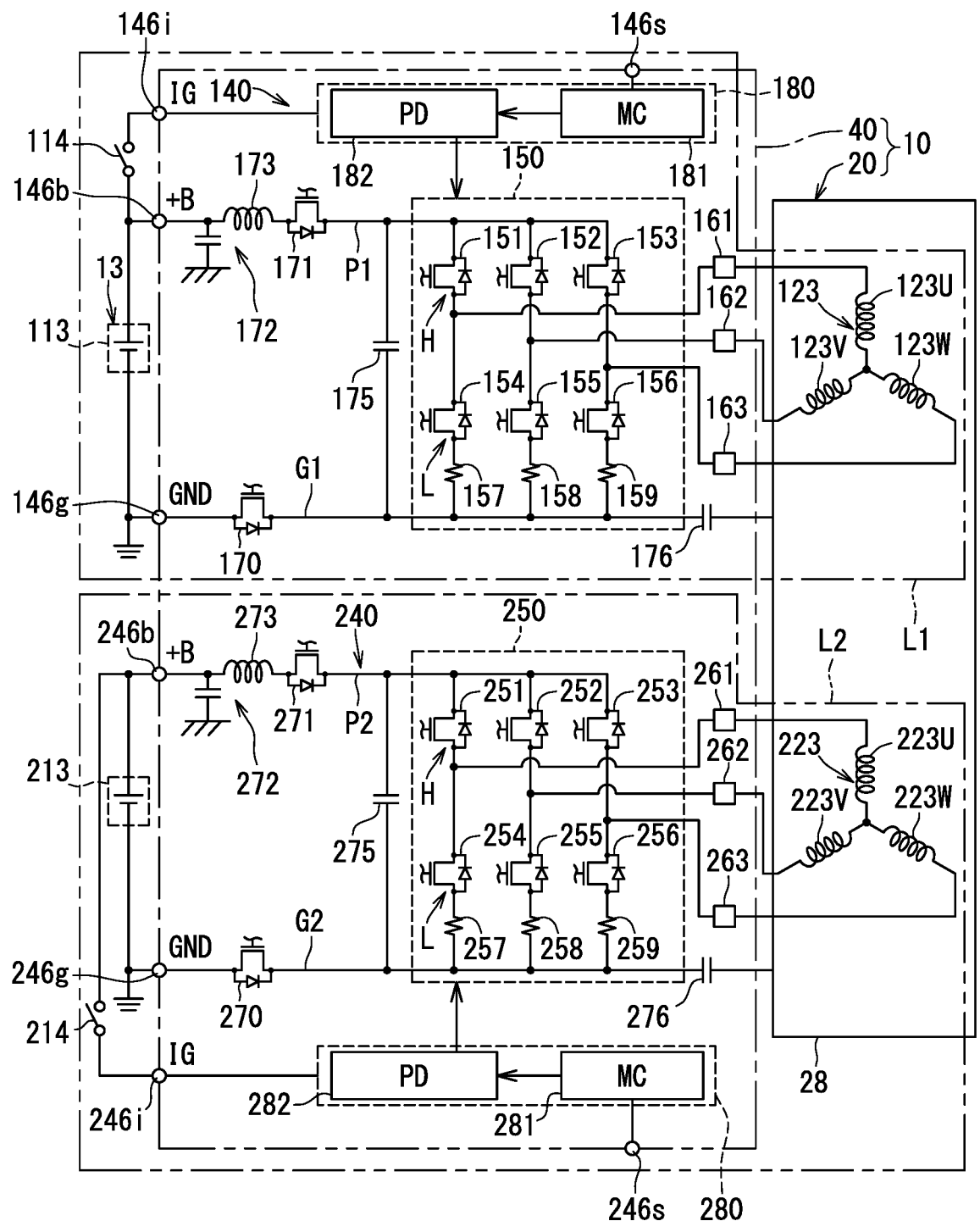
FIG. 4 is a circuit diagram of a drive unit according to a second embodiment.

FIG. 4, corresponding to FIG. 3, is a circuit diagram of the drive unit 10 according to the second embodiment. As shown in FIG. 4, the power supply relays 170 and 270 are provided on the ground lines G1 and G2, respectively. The reverse connection protection relays 171 and 271 are provided on the power supply lines P1 and P2, respectively. The coil 173 of the filter 172 is disposed between the reverse connection protection relay 171 and the +B terminal 146b.

The coil 273 of the filter 272 is disposed between the reverse connection protection relay 271 and the +B terminal 246b.

<Conclusion of Second Embodiment>

According to the second embodiment, likewise the precedent embodiment, the drive voltage of each of the power supply relays 170 and 270 can be reduced. In addition, heat dissipation of the power supply relays 170 and 270 can be increased. As a result, the body size of the substrate 42, i.e., the body size of the ECU 40 can be reduced.

Third Embodiment

The third embodiment is a modification of a precedent embodiment as a basic configuration and may incorporate description of the precedent embodiment.

Figure 5:
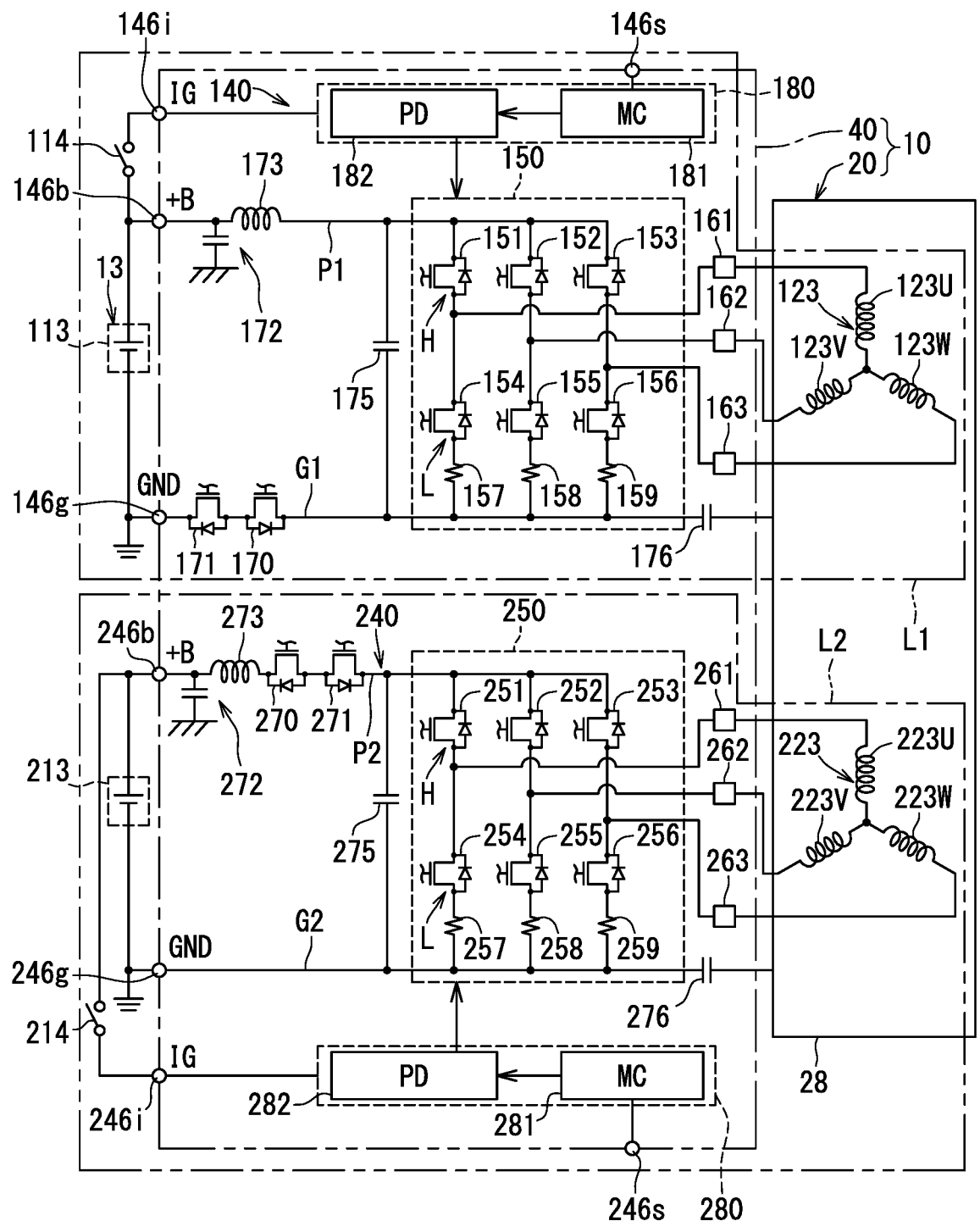
FIG. 5 is a circuit diagram of a drive unit according to a third embodiment.

FIG. 5, corresponding to FIG. 3, is a circuit diagram of the drive unit 10 according to the third embodiment. As shown in FIG. 5, the power supply relay 170 and the reverse connection protection relay 171 are provided on the ground line G1. The power supply relay 270 and the reverse connection protection relay 271 are provided on the power supply line P2. The sources of the power supply relay 270 and the reverse connection protection relay 271 are connected together. The power supply relay 270 and the reverse connection protection relay 271 are disposed so that the power supply relay 270 is located on a side adjacent to the +B terminal 246b. The coil 273 of the filter 272 is disposed between the power supply relay 270 and the +B terminal 246b.

<Conclusion of Third Embodiment>

According to the third embodiment, the ECU 40 has a plurality of circuit systems, in which the power supply relay 170 of one circuit system 140 is provided on the ground line G1, and the power supply relay 270 of the remaining circuit system 240 is provided on the power supply line P2. Consequently, the body size of the substrate 42 and in turn the body size of the ECU 40 can be reduced, as compared with a configuration where the power supply relay is provided on the power supply line in all of the circuit systems. Since the reverse connection protection relay 171 is proved on the ground line G1, the body size of the substrate 42 and in turn the body size of the ECU 40 can be reduced, as compared with a configuration where the reverse connection protection relay is provided on the power supply line in all of the circuit systems.

Such arrangement causes a drive voltage to be different between the power supply relay 170 of the system L1 and the power supply relay 270 of the system L2. Consequently, the predrivers 182 and 282 have different circuit configurations. Thus, failures due to common factors can be decreased. In other words, redundancy can be increased. The same holds true for the reverse connection protection relays 171 and 271.

Fourth Embodiment

The fourth embodiment is a modification of a precedent embodiment as a basic configuration and may incorporate description of the precedent embodiment.

Figure 6:
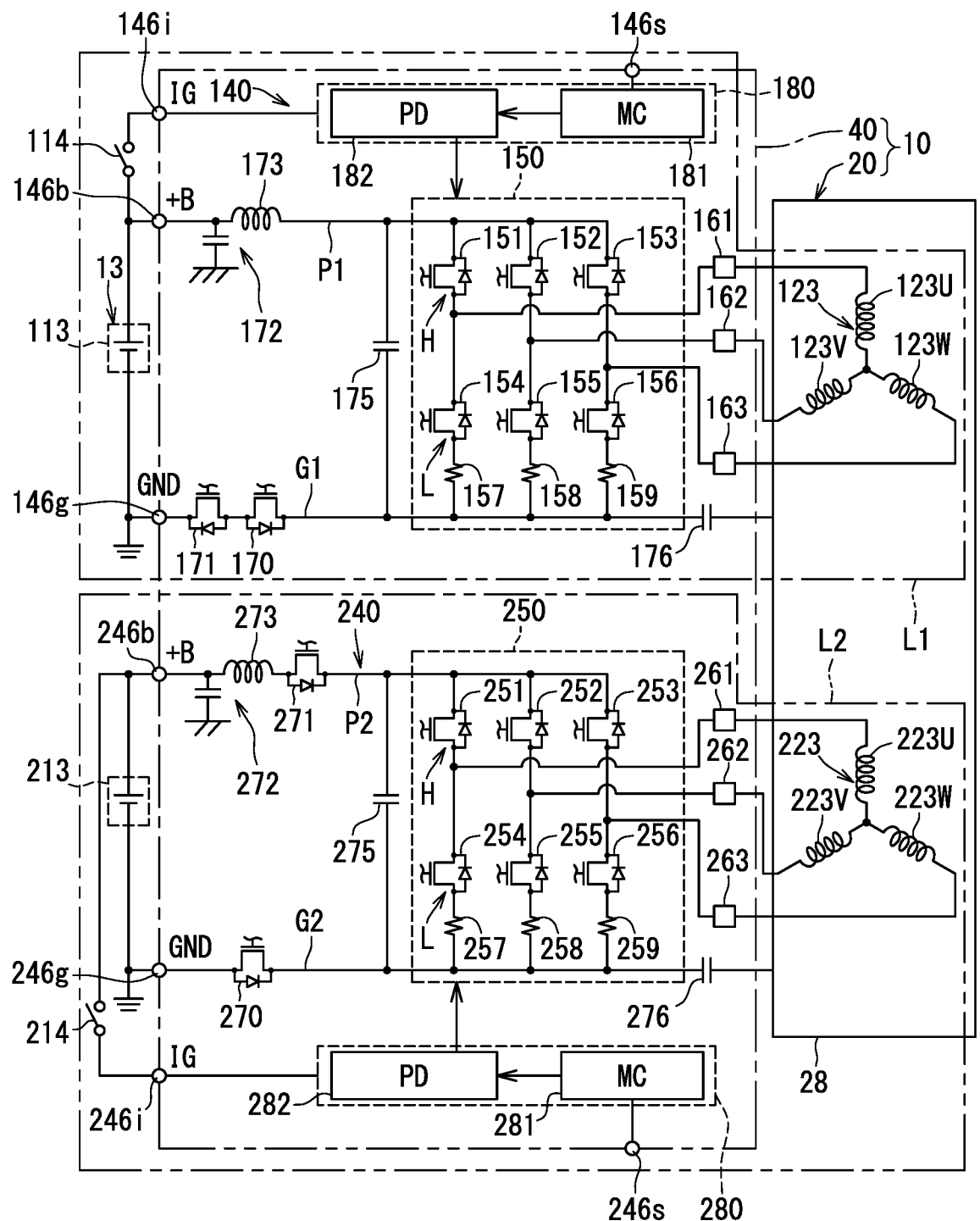
FIG. 6 is a circuit diagram of a drive unit according to a fourth embodiment.

FIG. 6, corresponding to FIG. 3, is a circuit diagram of the drive unit 10 according to the fourth embodiment. As shown in FIG. 6, the power supply relay 170 and the reverse connection protection relay 171 are provided on the ground line G1. The power supply relay 270 is provided on the ground line G2. The reverse connection protection relay 271 is provided on the power supply line P2. The coil 273 of the filter 272 is disposed between the reverse connection protection relay 271 and the +B terminal 246b.

<Conclusion of Fourth Embodiment>

According to the fourth embodiment, likewise the first embodiment, the drive voltage of each of the power supply relays 170 and 270 can be reduced. In addition, heat dissipation of the power supply relays 170 and 270 can be increased. As a result, the body size of the substrate 42, i.e., the body size of the ECU 40 can be reduced. Since the reverse connection protection relay 171 is proved on the ground line G1, the body size of the substrate 42 and in turn the body size of the ECU 40 can be reduced, as compared with a configuration where the reverse connection protection relay is provided on the power supply line in all of the circuit systems.

Such arrangement causes a drive voltage to be different between the reverse connection protection relay 171 of the system L1 and the reverse connection protection relay 271 of the system L2. Thus, the predrivers 182 and 282 have different circuit configurations. Consequently, failures due to common factors can be decreased. In other words, redundancy can be further increased.

Fifth Embodiment

The fifth embodiment is a modification of a precedent embodiment as a basic configuration and may incorporate description of the precedent embodiment. The fifth embodiment shows a configuration where effects are enhanced through a combination of the precedent embodiments.

Figure 7:
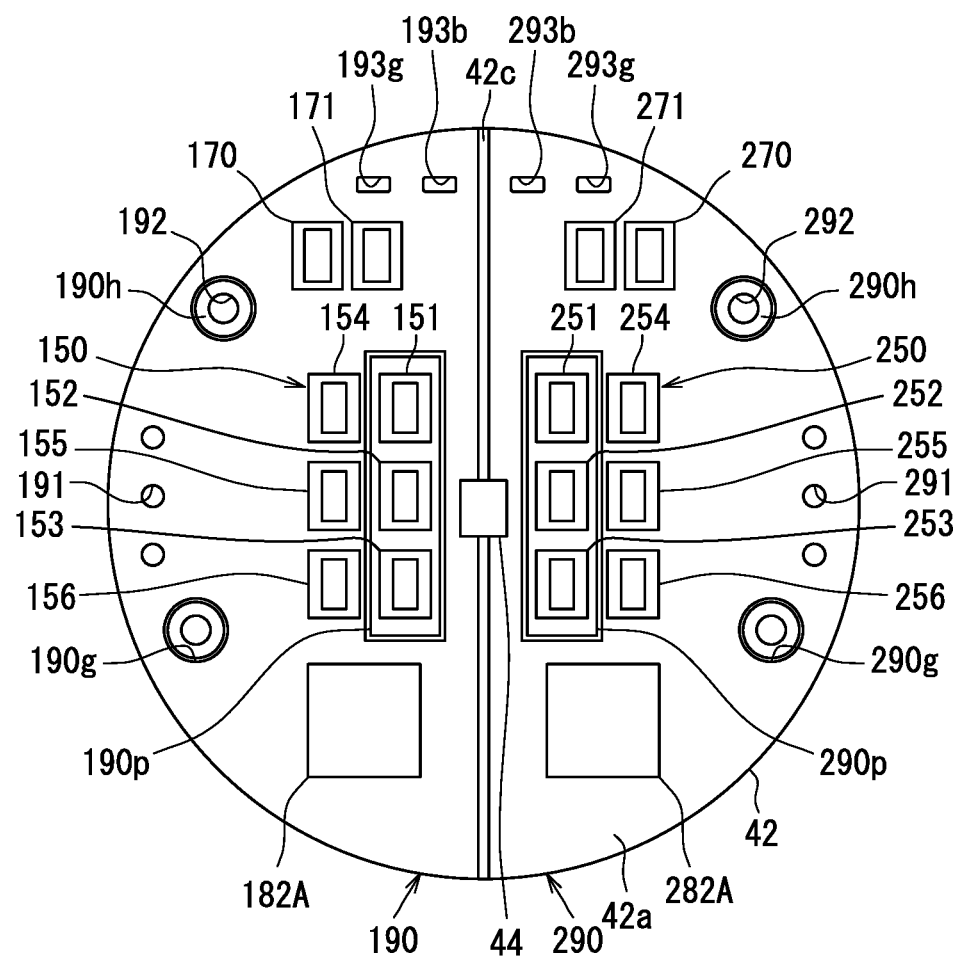
FIG. 7 is a plan view of a substrate of a drive unit, when viewed from a motor side, according to a fifth embodiment.
Figure 8:
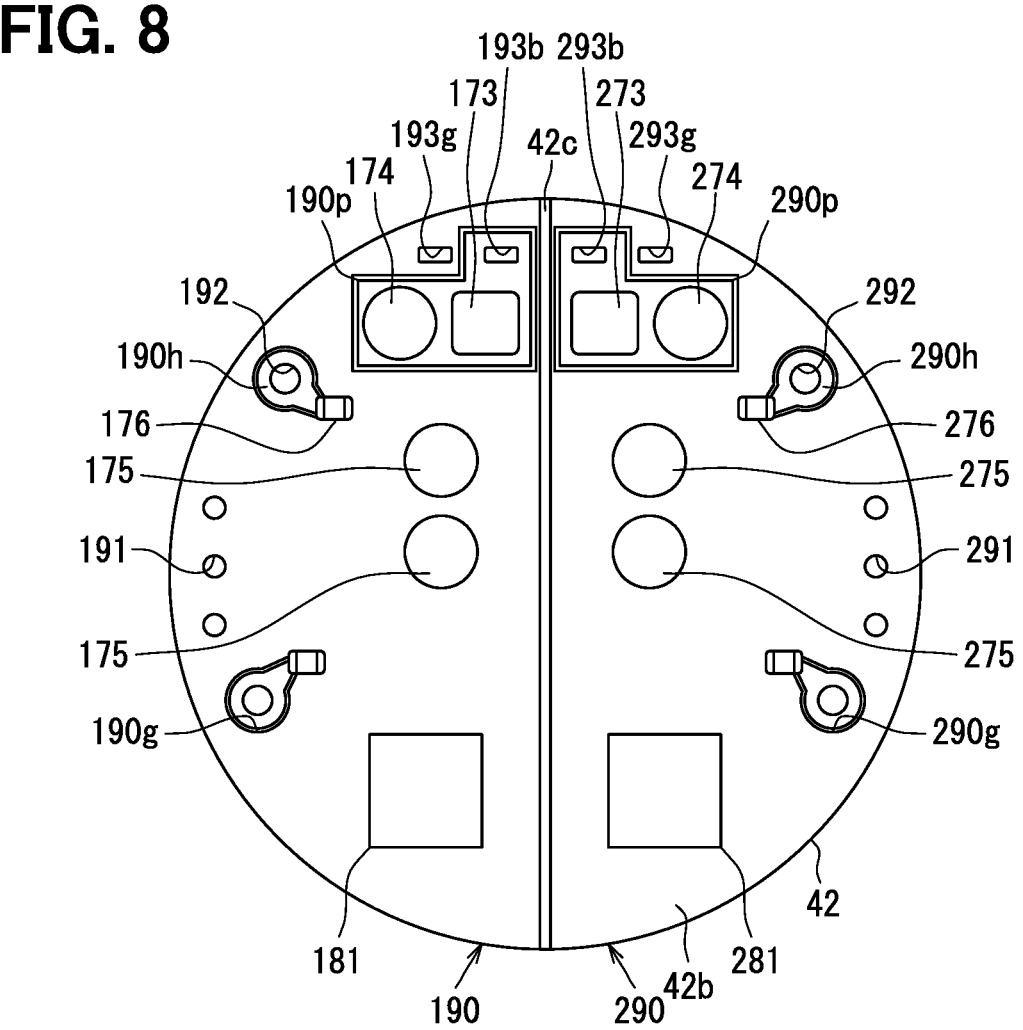
FIG. 8 is a plan view of the substrate, when viewed from a cover side.

FIG. 7 is a plan view of the substrate 42 of the drive unit 10 according to the fifth embodiment, when viewed from a side adjacent to the motor 20. FIG. 8 is a plan view of the substrate 42, when viewed from a side opposite to the motor 20. For illustrative purposes, arrangement of the cover surface 42b is reversed in FIG. 8 from that in FIG. 7 such that the circuit system 140 (system L1) is shown at the left of the sheet, and the circuit system 240 (system L2) is shown at the right in each of FIGS. 7 and 8.

As shown in FIGS. 7 and 8, the substrate 42 has wiring patterns 190 and 290. The substrate 42 is a multilayer substrate in which wiring patterns are disposed in multiple layers on an insulating base. The wiring patterns in the different layers are connected together through connection vias (not shown), for example. The wiring patterns 190 and 290 are electrically isolated from each other by a slit 42c. The slit 42c electrically divides the substrate 42 into two parts. For example, the slit 42c is straightly provided through the center of the substrate 42. The slit 42c is provided at a position at which the substrate 42, having a roughly true circular shape in a plan view, is substantially divided in two halves. In the fifth embodiment, for example, the wiring pattern 190 and electronic components configuring the circuit system 140 and the wiring pattern 290 and electronic components configuring the circuit system 240 are in an axisymmetric arrangement with reference to the slit 42c.

The wiring patterns 190 and 290 include ground patterns 190g and 290g configuring the ground lines G1 and G2, respectively. Major portions of the wiring patterns 190 and 290 correspond to the ground patterns 190g and 290g, respectively. Each of the ground patterns 190g and 290g occupies large area in each layer. FIGS. 7 and 8 show housing connection patterns 190h and 290h and power supply patterns 190p and 290p as the wiring patterns 190 and 290 other than the ground patterns 190g and 290g, respectively. For convenience, other patterns such as a signal pattern and an output wiring pattern to the motor 20 are not shown. The wiring patterns 190 and 290 are thus illustrated in a simplified manner. Hence, the wiring pattern 190 or 290 and an electronic component in an overlapped positional relationship in a plan view are not necessarily in an electrically connected relationship.

As shown in FIGS. 7 and 8, the substrate 42 has motor line connections 191 and 291, substrate connections 192 and 292, and terminal connections. The motor line connections 191 and 291 are each a connection to be connected to the lead 34 on the substrate 42. The motor line connections 191 and 291 each include a land formed by plating or the like on a wall surface of the through-hole and a bonding material such as solder. The lead 34 is connected to the substrate 42 by the bonding material while penetrating the through-hole. In a direction perpendicular to the extending direction of the slit 42c, the motor line connection 191 is provided on one end side of the substrate 42 while the motor line connection 291 is provided on the other end side.

The substrate connections 192 and 292 are each a through-hole to receive the bolt 43 therein. The housing connection patterns 190h and 290h are formed around the substrate connections 192 and 292, respectively, on each of the motor surface 42a and the cover surface 42b. In a state where the substrate 42 is fixed by the bolts 43, heads of the bolts 43 are in contact with the respective housing connection patterns 190h and 290h on the cover surface 42b. The rear frame end 31 is in contact with each of the housing connection patterns 190h and 290h on the motor surface 42a. Consequently, the housing connection patterns 190h and 290h are electrically connected to the rear frame end 31 through the bolts 43. In the fifth embodiment, the housing connection patterns 190h and 290h are electrically separated from other wiring patterns.

The respective terminal connections are connections to be connected to the terminals 46 of the connector 45. The terminal connections each include a land formed by plating or the like on a wall surface of the through-hole and a bonding material such as solder. Each terminal 46 is connected to the substrate 42 by the bonding material while penetrating the through-hole. The terminal connection is provided for each terminal 46. For convenience, FIGS. 7 and 8 each exclusively show +B connections 193b and 293b connected to the +B terminals 146b and 246b and ground connections 193g and 293g connected to the ground terminals 146g and 246g. The +B connections 193b and 293b are electrically connected to the power supply patterns 190p and 290p, respectively. The ground connections 193g and 293g are electrically connected to the ground patterns 190g and 290g, respectively.

The +B connections 193b and 293b and the ground connections 193g and 293g are provided on one end side of the substrate 42 in the extending direction of the slit 42c. While not shown, the respective terminal connections include IG connections connected to the IG terminals 146i and 246i and signal connections connected to the signal terminals 146s and 246s. The respective IG connections and signal connections are electrically connected to corresponding wiring patterns.

As shown in FIG. 7, the switching elements 151 to 156 configuring the inverter 150, the power supply relays 170 and 270, and the reverse connection protection relays 171 and 271 are mounted on the motor surface 42a of the substrate 42. Unified ICs 182A and 282A and the rotation angle sensor 44 are mounted on the motor surface 42a. The rotation angle sensor 44 is mounted across the slit 42c on the motor surface 42a. The unified IC 182A includes the predriver 182, and the unified IC 282A includes the predriver 282. While not shown, the shunt resistors 157 to 159 and 257 to 259 and the motor relays 161 to 163 and 261 to 263 are also mounted on the motor surface 42a.

Drains of the switching elements 151 to 153 and 251 to 253 on an upper arm H side are electrically connected to the power supply patterns 190p and 290p, respectively. The power supply pattern 190p on the motor surface 42a is connected to the power supply pattern 190p on the cover surface 42b through the connection via. Sources of the switching elements 151 to 153 and 251 to 253 are connected to output wiring patterns (not shown) through connection vias, for example. The power supply pattern 290p has a configuration similar to that of the power supply pattern 190p.

Sources of the switching elements 154 to 156 and 254 to 256 on a lower arm L side are electrically connected to the ground patterns 190g and 290g, respectively. As described above, the ground patterns 190g and 290g are electrically connected to the ground connections 193g and 293g, respectively. Sources of the switching elements 154 to 156 and 254 to 256 may be connected to the ground connections 193g and 293g through the inner-layer ground patterns 190g and 290g, respectively. Drains of the switching elements 154 to 156 and 254 to 256 are connected to output wiring patterns (not shown). The output wiring patterns are electrically connected to the motor line connections 191 and 291.

The power supply relays 170 and 270 and the reverse connection protection relays 171 and 271 are electrically connected to the ground patterns 190g and 290g, respectively. The relays 170, 171 and the relays 270, 271 may be electrically connected to the ground connections 193g and 293g, respectively, on the motor surface 42a. Such relays may be connected to the ground connections 193g and 293g through the inner-layer ground patterns 190g and 290g, respectively.

As shown in FIG. 7, the respective switching elements 151 to 156 and 251 to 256 configuring the inverters 150 and 250 are disposed in a central region of the substrate 42 to have a roughly rectangular shape in a plan view. On the other hand, the respective power supply relays 170 and 270 are disposed between the inverters 150, 250 and the ground connections 193g, 293g. That is, the power supply relay 170 is disposed at a position closer to the ground connection 193g than any of the switching elements 151 to 156 configuring the inverter 150. The power supply relay 270 is disposed at a position closer to the ground connection 293g than any of the switching elements 251 to 256 configuring the inverter 250. The power supply relays 170 and 270 are disposed near the ground connections 193g and 293g, respectively. In the fifth embodiment, the respective reverse connection protection relays 171 and 271 are also disposed between the inverters 150, 250 and the ground connections 193g, 293g. The reverse connection protection relays 171 and 271 are also disposed near the ground connections 193g and 293g, respectively.

The power supply relay 170 is disposed at a position closer to the substrate connection 192, i.e., closer to the bolt 43, than any of the switching elements 151 to 156 configuring the inverter 150. The power supply relay 270 is disposed at a position closer to the substrate connection 292, i.e., closer to the bolt 43, than any of the switching elements 251 to 256 configuring the inverter 250. The power supply relays 170 and 270 are each disposed near the bolt 43 as a fixed member.

As shown in FIG. 8, the coils 173, 273 and the capacitors 174, 274 configuring the filters 172 and 272, respectively, and the smoothing capacitors 175 and 275 are mounted on the cover surface 42*b* of the substrate 42. Further, the electromechanical connection capacitors 176 and 276 and the microcomputers 181 and 281 are mounted on the cover surface 42*b*.

The coils 173, 273 and the capacitors 174, 274 are disposed near the +B connections 193*b* and 293*b* as well as the ground connections 193*g* and 293*g*, respectively. The coils 173 and 273 are electrically connected to the power supply patterns 190*p* and 290*p*, respectively. Positive electrodes of the capacitors 174 and 274 are connected to the power supply patterns 190*p* and 290*p*, respectively. Negative electrodes of the capacitors 174 and 274 are connected to the ground patterns 190*g* and 290*g*, respectively.

The smoothing capacitors 175 and 275 are disposed in the central region of the cover surface 42*b*. Positive electrodes of the smoothing capacitors 175 and 275 are connected to the power supply patterns 190*p* and 290*p*, respectively. Negative electrodes of the smoothing capacitors 175 and 275 are connected to the ground patterns 190*g* and 290*g*, respectively.

The electromechanical connection capacitors 176 and 276 are disposed near the substrate connections 192 and 292, respectively. The electromechanical connection capacitor 176 connects the ground pattern 190*g* and the housing connection pattern 190*h*. The electromechanical connection capacitor 276 connects the ground pattern 290*g* and the housing connection pattern 290*h*. The housing 28 is connected to the vehicle ground. In other words, the electromechanical connection capacitors 176 and 276 each connect between the grounds.

As described above, in the drive unit 10 applied to the electric steering device 4, since a large current is applied in a short time, switching noise or ringing noise occurs. The source of such noise is mainly within the circuit of the ECU 40, and the noise may be transferred to a vehicle side via the connector 45 and the motor 20. The bolts 43 are therefore used to electrically connect the ground lines G1 and G2 of the substrate 42 to the housing 28 to form a noise feedback path from the motor 20 side to the ECU 40 side. Consequently, the noise occurring within the circuit of the ECU 40 is fed back to the noise source, and thus noise transfer to the vehicle side is suppressed.

<Conclusion of Fifth Embodiment>

According to the fifth embodiment, the power supply relay 170 is disposed at a position closer to the ground connection 193*g* than any of the switching elements 151 to 156 as heat generating components. Consequently, heat of the power supply relay 170 can be released to the ground terminal 146*g* through the ground pattern 190*g* configuring the ground line G1 and the ground connection 193*g*. Since the area of the ground pattern 190*g* is larger than the area of other wiring patterns, heat of the power supply relay 170 is easily transferred to the terminal 46 (ground terminal 146*g*). Since the power supply relay 170 is located near the ground connection 193*g*, heat of the power supply relay 170 is easily transferred to the connector 45. As a result, heat of the power supply relay 170 can be effectively dissipated to the outside of the ECU 40 through the connector 45. Such an increase in heat dissipation makes it possible to further reduce the body size of the substrate 42 and in turn the body size of the ECU 40. The same holds true for the power supply relay 270.

According to the fifth embodiment, the reverse connection protection relay 171 is also disposed at a position closer to the ground connection 193*g* than any of the switching elements 151 to 156. Consequently, heat of the reverse connection protection relay 171 can be effectively dissipated to the outside of the ECU 40 through the connector 45. The same holds true for the reverse connection protection relay 271.

The power supply relay 170 is disposed at a position closer to the substrate connection 192, i.e., bolt 43, than any of the switching elements 151 to 156. Consequently, heat of the power supply relay 170 can be released to the housing 28 (rear frame end 31) of the motor 20 through the bolt 43. As a result, heat of the power supply relay 170 can be effectively dissipated to the outside of the ECU 40. Such enhancement of heat dissipation makes it possible to further reduce the body size of the substrate 42 and in turn the body size of the ECU 40. The same holds true for the power supply relay 270. Through the two heat dissipation paths including the connector 45 and the bolts 43, heat of the power supply relays 170 and 270 can be effectively dissipated to the outside of the ECU 40.

Figure 9:
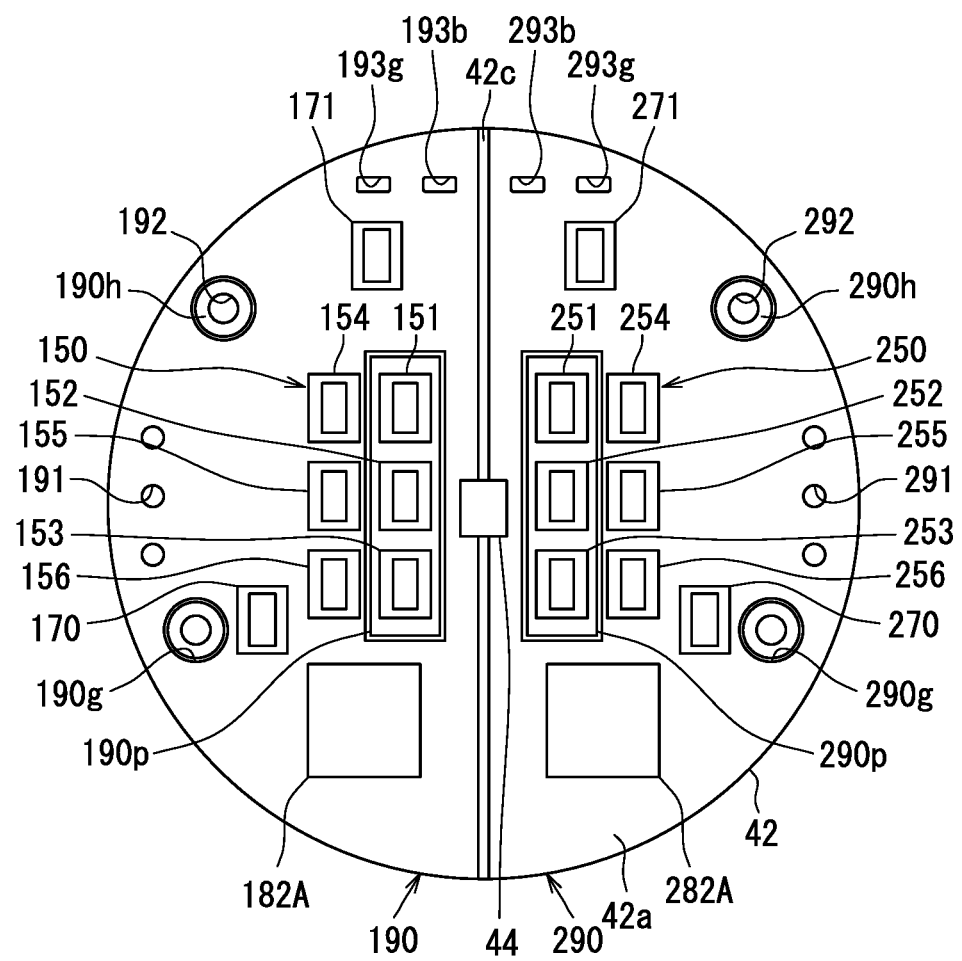
FIG. 9 is a plan view illustrating a modification.

Arrangement of the power supply relays 170 and 270 is not limited to that in the above-described example. The power supply relay 170 may be disposed at a position closer to the ground connection 193*g* and/or the substrate connection 192 than any of the switching elements 151 to 156. The same holds true for the power supply relay 270. For example, as in a modification shown in FIG. 9, the power supply relays 170 and 270 may be disposed at positions away from the ground connections 193*g* and 293*g*, respectively. The power supply relays 170 and 270 shown in FIG. 9 are disposed near the substrate connections 192 and 292 relatively far from the ground connections 193*g* and 293*g*, respectively.

Only one of the two circuit systems 140 and 240 may be disposed to have high heat dissipation. For example, while the power supply relay 170 is provided near the ground connection 193*g*, the power supply relay 270 may be provided at a position further than the inverter 250 from each of the ground connection 293*g* and the substrate connection 292.

Sixth Embodiment

The sixth embodiment is a modification of a precedent embodiment as a basic configuration and may incorporate description of the precedent embodiment.

Figure 10:
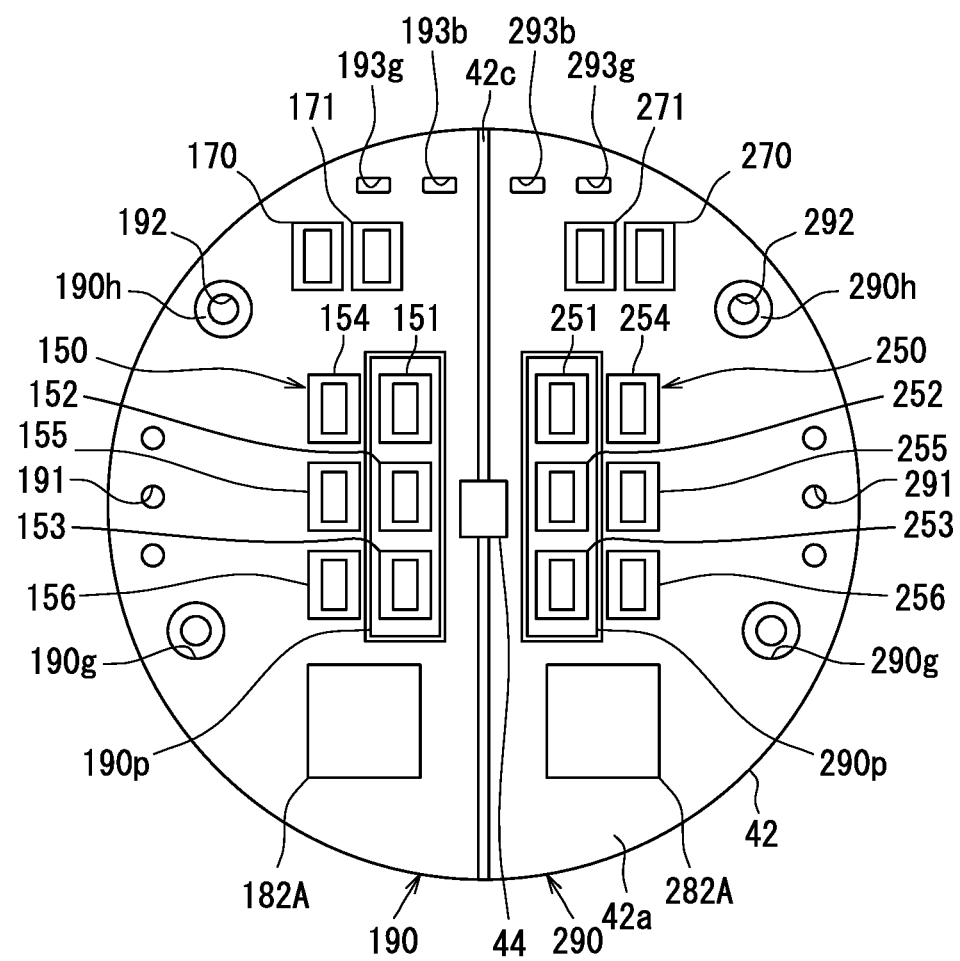
FIG. 10 is a plan view of a substrate of a drive unit, when viewed from a motor side, according to a sixth embodiment.
Figure 11:
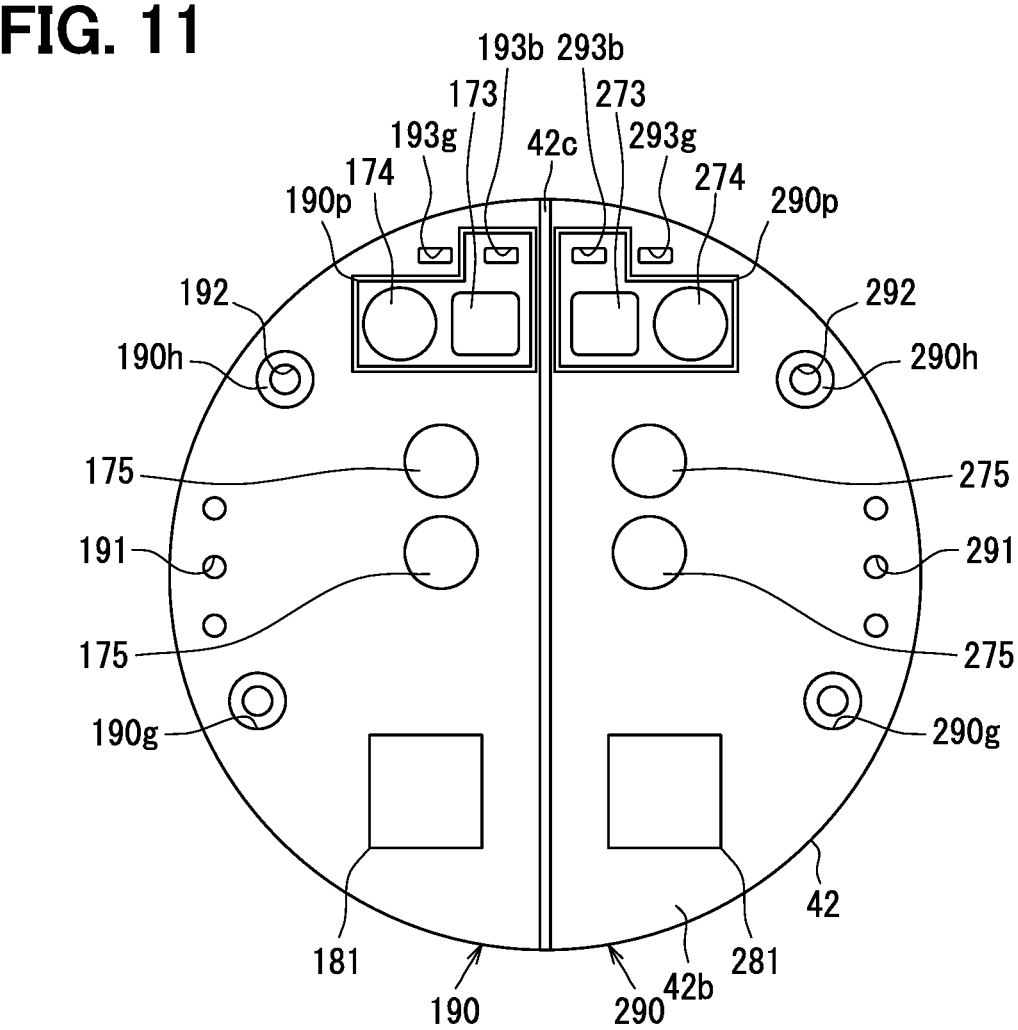
FIG. 11 is a plan view of the substrate, when viewed from a cover side.

While not shown, the drive unit 10 of the sixth embodiment has a configuration where the electromechanical connection capacitors 176 and 276 are eliminated from the precedent embodiment (see FIG. 3). The housing 28 is connected to the ground lines G1 and G2. FIGS. 10 and 11 show the substrate 42 of the drive unit 10. The electromechanical connection capacitors 176 and 276 are not mounted on the motor surface 42*a* or the cover surface 42*b*.

The housing connection patterns 190*h* and 290*h* are connected to the ground patterns 190*g* and 290*g*, respectively. Although distinctively shown in FIGS. 10 and 11 for illustrative purposes, the housing connection patterns 190*h* and 290*h* are parts of the ground patterns 190*g* and 290*g*, respectively. Other configuration is the same as that of the fifth embodiment (see FIGS. 7 and 8).

<Conclusion of Sixth Embodiment>

According to the sixth embodiment, the respective bolts 43 are electrically connected to the ground patterns 190*g* and 290*g*. Heat of the respective power supply relays 170 and 270 is easily released from the bolts 43 to the housing 28 through the ground patterns 190*g* and 290*g*. As a result, heat of the respective power supply relays 170 and 270 can be effectively dissipated to the outside of the ECU 40. The effect of heat dissipation can be further enhanced by providing the respective power supply relays 170 and 270 near the substrate connections 192 and 292 to be connected to the bolts 43.

Seventh Embodiment

The seventh embodiment is a modification of a precedent embodiment as a basic configuration and may incorporate description of the precedent embodiment.

Figure 12:
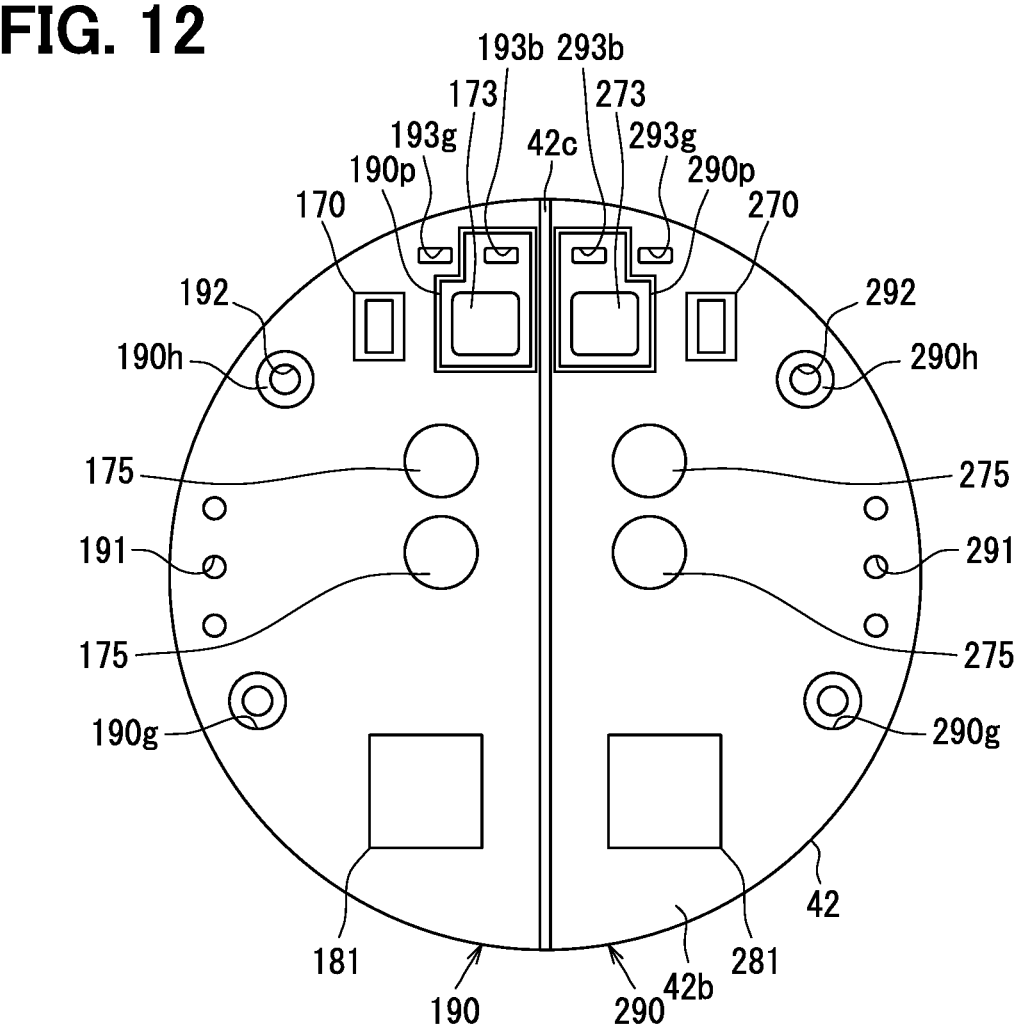
FIG. 12 is a plan view of a substrate of a drive unit, when viewed from a cover side, according to a seventh embodiment.
Figure 13:
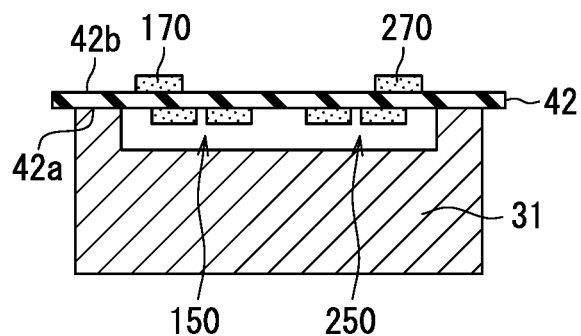
FIG. 13 is a sectional view illustrating a state where the substrate shown in FIG. 7 is fixed to a motor.

In the seventh embodiment, as shown in FIGS. 12 and 13, the power supply relays 170 and 270 are mounted on the cover surface 42b of the substrate 42. That is, the power supply relays 170 and 270 are mounted on a surface different from the surface on which the switching elements 151 to 156 and 251 to 256 configuring the inverters 150 and 250, respectively, are mounted. In the seventh embodiment, the smoothing capacitors 175 and 275 also serve as capacitors of the filters 172 and 272, respectively. The power supply relays 170 and 270 are mounted near the ground connections 193g and 293g, respectively. In a plan view viewed in a thickness direction of the substrate 42, the power supply relays 170 and 270 are disposed at positions closer to the ground connections 193g and 293g and to the substrate connections 192 and 292 than any of the switching elements 151 to 156 and 251 to 256.

<Conclusion of Seventh Embodiment>

According to the precedent embodiment, heat dissipation of the power supply relays 170 and 270 can be enhanced. The enhancement of the heat dissipation of the power supply relays 170 and 270 makes it possible to mount the power supply relays 170 and 270 on the cover surface 42b instead of the surface on a side adjacent to the housing 28 (rear frame end 31) having a larger heat mass than the cover 41. This makes it possible to separate the mounting surface of the switching elements 151 to 156 and 251 to 256 configuring the inverters 150 and 250, respectively, from the mounting surface of the power supply relays 170 and 270. As a result, it is possible to reduce the body size of the substrate 42 and in turn the body size of the ECU 40, as compared with a configuration where the power supply relays 170 and 270 and the switching elements 151 to 156 and 251 to 256 are all mounted on the same surface.

An example where both the power supply relays 170 and 270 are mounted on the cover surface 42b has been shown, but the present disclosure is not limited to this example. Only one of the power supply relays 170 and 270 may be mounted on the cover surface 42b. This also makes it possible to reduce the body size of the substrate 42.

Figure 14:
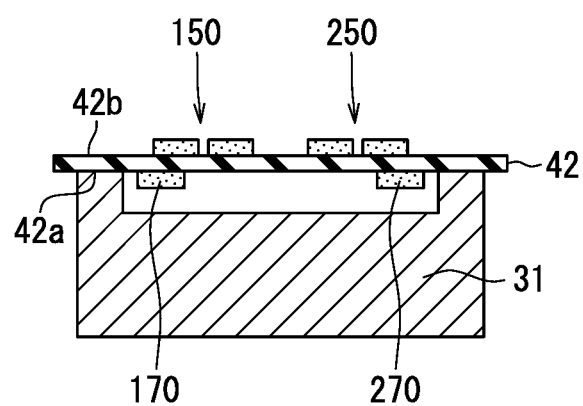
FIG. 14 is a sectional view illustrating a modification.

Although the power supply relays 170 and 270 and the switching elements 151 to 156 and 251 to 256 are partially mounted on one surface while the rest is mounted on the other surface, such a configuration is not limited to the above-described example. For example, as in a modification shown in FIG. 14, the switching elements 151 to 156 and 251 to 256 may be mounted on the cover surface 42b while the power supply relays 170 and 270 on the motor surface 42a. Although both the power supply relays 170 and 270 are mounted on the motor surface 42a in FIG. 14, only one of the power supply relays may be mounted on the motor surface 42a.

Other Embodiments

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

The control sections 180 and 280 are each provided by a control system including at least one computer. The control system includes at least one processor (hardware processor) being hardware. The hardware processor can be provided in one of the following ways (1), (2), and (3).

(1) The hardware processor may be a hardware logic circuit. In such a case, the computer is provided by a digital circuit including a large number of programmed logic units (gate circuits). The digital circuit may have a memory that stores a program and/or data. The computer may be provided by an analog circuit. The computer may be provided by a combination of a digital circuit and an analog circuit.

(2) The hardware processor may be at least one processor core that executes a program stored in at least one memory. In such a case, the computer is provided by the at least one memory and the at least one processor core. The processor core is referred to as CPU, for example. The memory may be referred to as storage medium. The memory is a non-transitional and substantial storage medium that non-transitorily stores "program and/or data" readable by the processor.

(3) The hardware processor may be a combination of the hardware logic circuit (1) and the processor core (2). The logic circuit (1) and the processor core (2) are disposed on different chips or a common chip.

That is, measures and/or functions provided by the control sections 180 and 280 can be provided by hardware only, software only, or a combination of hardware and software.

An example where the fully redundant electric steering device 4 has been shown, but the present disclosure is not limited to this example. For example, the two circuit systems 140 and 240 may share a microcomputer. The two systems L1 and L2 may share the power supply system 13 (power supply unit). The two circuit systems 140 and 240 may share a filter circuit.

The arrangement of the power supply relays is not limited to the ECU 40 having a plurality of circuit systems. For example, the arrangement can be applied to a configuration where the motor 20 includes only one set of stator coils 23 and the ECU 40 has a single circuit system.

What is claimed is:

1. An electric steering device, comprising:
    a motor that applies a steering force to a steering mechanism of a vehicle; and
    a control circuit that controls the motor, and includes
        an inverter that converts DC power supplied from a DC power supply to AC power and supplies the AC power to the motor, and
        a power supply relay that permits or blocks a current flow to the motor through the inverter, wherein
    in the control circuit, the power supply relay is disposed on a ground line connecting the inverter and a ground.

2. The electric steering device according to claim 1, wherein
    the power supply relay is configured to be turned on with a drive voltage that is equal to or lower than a voltage of the DC power supply.

3. The electric steering device according to claim 1, wherein the control circuit further includes a reverse connection protection relay that blocks a current flow in a direction opposite to the current flow permitted by the power supply relay.

4. The electric steering device according to claim 3, wherein the reverse connection protection relay is provided on the ground line in the control circuit.

5. The electric steering device according to claim 4, wherein the power supply relay and the reverse connection protection relay include switching elements having parasitic diodes, respectively, and anodes of the parasitic diodes are connected together.

6. The electric steering device according to claim 1, wherein the motor has a plurality of stator coils, the control circuit has a plurality of circuit systems configured to be redundant in correspondence to the stator coils, and each of the circuit systems has the power supply relay provided on the ground line.

7. The electric steering device according to claim 1, wherein the motor has a plurality of stator coils, the control circuit has a plurality of circuit systems configured to be redundant in correspondence to the stator coils, a part of the plurality of circuit systems has the power supply relay provided on the ground line, as a first power supply relay, a remaining of the plurality of circuit systems has a second power supply relay that is provided on a power supply line connecting the DC power supply and the inverter, and the second power supply relay permits or blocks a current flow to the motor through the inverter.

8. The electric steering device according to claim 1, wherein the control circuit includes a substrate having a wiring pattern and a connector mounted on the substrate, the wiring pattern provides the ground line, the connector includes a ground terminal, and on the substrate, the power supply relay is disposed at a position closer than the inverter to a connection of the ground terminal.

9. The electric steering device according to claim 8, wherein on the substrate, the power supply relay is disposed on a surface different from a surface on which the inverter is disposed.

10. The electric steering device according to claim 1, wherein the control circuit includes a substrate having a wiring pattern that provides the ground line, the motor has a metal housing, the substrate is fixed to the housing through a metal fixing member, and on the substrate, the power supply relay is disposed at a position closer than the inverter to a fixing part of the fixing member.

11. The electric steering device according to claim 9, wherein the fixing member is electrically connected to the wiring pattern.

* * * * *